US011971688B2

United States Patent
Kato

(10) Patent No.: US 11,971,688 B2
(45) Date of Patent: Apr. 30, 2024

(54) ELECTRONIC TIMEPIECE AND INDICATION CONTROL METHOD

(71) Applicant: CASIO COMPUTER CO., LTD., Tokyo (JP)

(72) Inventor: Atsushi Kato, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 185 days.

(21) Appl. No.: 17/166,647

(22) Filed: Feb. 3, 2021

(65) Prior Publication Data

US 2021/0240140 A1 Aug. 5, 2021

(30) Foreign Application Priority Data

Feb. 4, 2020 (JP) ................................ 2020-016725

(51) Int. Cl.
*G04C 17/00* (2006.01)
*G04B 19/243* (2006.01)
*G04C 3/14* (2006.01)

(52) U.S. Cl.
CPC ... *G04C 17/0041* (2013.01); *G04B 19/24313* (2013.01); *G04C 3/146* (2013.01)

(58) Field of Classification Search
CPC .......... G04B 19/24313; G04C 17/0041; G04C 3/146
See application file for complete search history.

(56) References Cited

U.S. PATENT DOCUMENTS

2010/0246336 A1* 9/2010 Luk ...................... G04G 9/0076 368/28
2017/0075306 A1* 3/2017 Morohoshi ............ G04C 17/00
2019/0324406 A1* 10/2019 Tezuka ............... G04C 17/0066

FOREIGN PATENT DOCUMENTS

JP H08-327754 A 12/1996
JP 2010066046 A 3/2010
JP 2015-111164 A 6/2015
JP 2015111164 A 6/2015
JP 2015-158449 A 9/2015
(Continued)

OTHER PUBLICATIONS

Notice of Reasons for Refusal dated Mar. 1, 2022 received in Japanese Patent Application No. JP 2020-016725 together with an English language translation.
(Continued)

*Primary Examiner* — Renee S Luebke
*Assistant Examiner* — Matthew Daniel Hwang
(74) *Attorney, Agent, or Firm* — Scully, Scott, Murphy & Presser, P.C.

(57) ABSTRACT

An electronic timepiece includes: a first indicator and a second indicator that are configured to rotate in combination with each other; an operation receiver; and at least one processor. The at least one processor is configured to set a set position that is to be indicated by the second indicator in response to an input operation received by the operation receiver. The at least one processor is configured to cause the first indicator and the second indicator to temporarily stop rotating in combination with each other at a timing when the second indicator indicates the set position, and cause the first indicator and the second indicator to resume rotating in combination with each other after a set time passes.

14 Claims, 6 Drawing Sheets

(56) References Cited

FOREIGN PATENT DOCUMENTS

| | | | |
|---|---|---|---|
| JP | 2019-052881 | A | 4/2019 |
| JP | 2019-190938 | A | 10/2019 |

OTHER PUBLICATIONS

Notice of Reasons for Refusal dated Nov. 21, 2023 received in Japanese Patent Application No. JP 2022-126732.

Decision of Reasons for Refusal dated Mar. 12, 2024 received in Japanese Patent Application No. JP 2022-126732.

* cited by examiner

ELECTRONIC TIMEPIECE AND INDICATION CONTROL METHOD

CROSS-REFERENCE TO RELATED APPLICATIONS

This application is based upon and claims the benefit of priority under 35 USC 119 of Japanese Patent Application No. 2020-016725 filed on Feb. 4, 2020, the entire disclosure of which is incorporated herein by reference in its entirety.

BACKGROUND OF THE INVENTION

1. Field of the Invention

The present disclosure relates to an electronic timepiece and an indication control method.

2. Description of the Related Art

A known electronic timepiece is capable of indicating various kinds of information as well as current time by moving multiple indicators. The indicators may include general members that rotate on/in a flat surface. A portable timepiece, especially a small wristwatch, has limited size, weight, and battery capacity and therefore may cause multiple indicators to rotate in combination with each other with a common motor.

Indicators that rotate in combination with each other may require a long time to move to their respective desired positions. JPH08-327754A discloses a technique to set a first indicated time to a second indicated time or to change the second indicated time to, for example, a time for which an alarm is set by one operation, thereby reducing time and effort due to an operational error of a user.

SUMMARY

An electronic timepiece according to an embodiment includes: a first indicator and a second indicator that are configured to rotate in combination with each other; an operation receiver; and at least one processor, wherein the at least one processor is configured to set a set position that is to be indicated by the second indicator in response to an input operation received by the operation receiver, cause the first indicator and the second indicator to temporarily stop rotating in combination with each other at a timing when the second indicator indicates the set position; and cause the first indicator and the second indicator to resume rotating in combination with each other after a set time passes.

An indication control method according to an embodiment is for an electronic timepiece that includes: a first indicator and a second indicator that are configured to rotate in combination with each other; and an operation receiver. The indication control method includes: setting a set position that is to be indicated by the second indicator in response to an input operation received by the operation receiver; causing the first indicator and the second indicator to temporarily stop rotating in combination with each other at a timing when the second indicator indicates the set position; and causing the first indicator and the second indicator to resume rotating in combination with each other after a set time passes.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION OF THE INVENTION

Hereinafter, one or more embodiments is described in detail with reference to the drawings.

Figure 1:
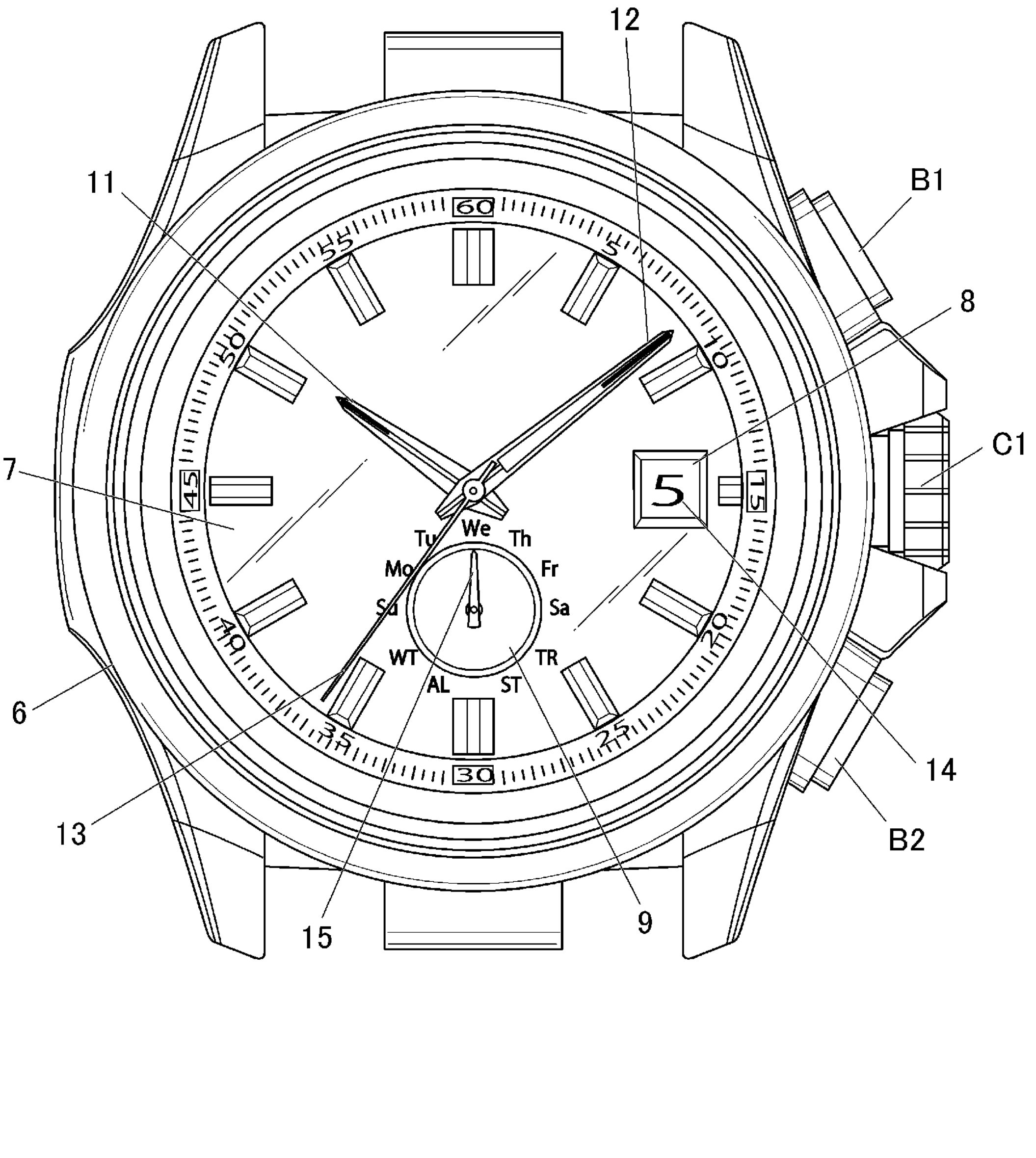
FIG. 1 is a front view of an analog electronic timepiece according to an embodiment of the present invention.

FIG. 1 is a front view of an analog electronic timepiece 1 according to an embodiment.

The analog electronic timepiece 1 is an electronic wristwatch that is capable of indicating the date and time with five indicators. The indicators include a date indicator 14 (first indicator) that is a rotatable disc. The analog electronic timepiece 1 includes a casing 6, a dial 7, a windshield that covers the indication surface of the dial 7, an hour hand 11, a minute hand 12, a second hand 13, and a function indicator 15 (second indicator). The hour hand 11, minute hand 12, second hand 13, and function indicator 15 are placed between the dial 7 and the windshield. The date indicator 14 is placed under the dial 7 (at the side opposite to the windshield) so as to be substantially parallel to the dial 7. The hour hand 11, minute hand 12, second hand 13, and date indicator 14 are placed to be rotatable on the same shaft at the central part of the dial 7. The function indicator 15 is placed to be rotatable inside a small window 9 that is positioned at six o'clock direction of the dial 7. Pressing button switches B1, B2 and a crown C1 are placed at the lateral surface of the casing 6.

The small window 9 has icons for indicating a function mode that is currently performed and for indicating a day of the week at the current home position. The icons are positioned at regular intervals on the circumference of the small window 9. The icons include: icons showing Sunday to Saturday; an icon "WT" for a function regarding the world time; an icon "AL" for an alarming function; an icon "ST" for a stopwatch function; and an icon "TR" for a timer function.

The date indicator 14 is a rotatable circular disc (rotatable plate). On the circumference of the date indicator 14, icons indicating dates 1 to 31 (date icons) are arranged in order at regular intervals (at 360/31 degree intervals). By rotating the date indicator 14, one of the date icons is exposed in the opening 8 provided at three o'clock direction of the dial 7, so that the date is shown.

The pressing button switches B1, B2 receive operations by being pressed by a user. The crown C1 can be pulled to receive the pulling operation. The crown C1 receives a rotating operation in the state of being pulled out and a pushing-back operation.

Figure 2:
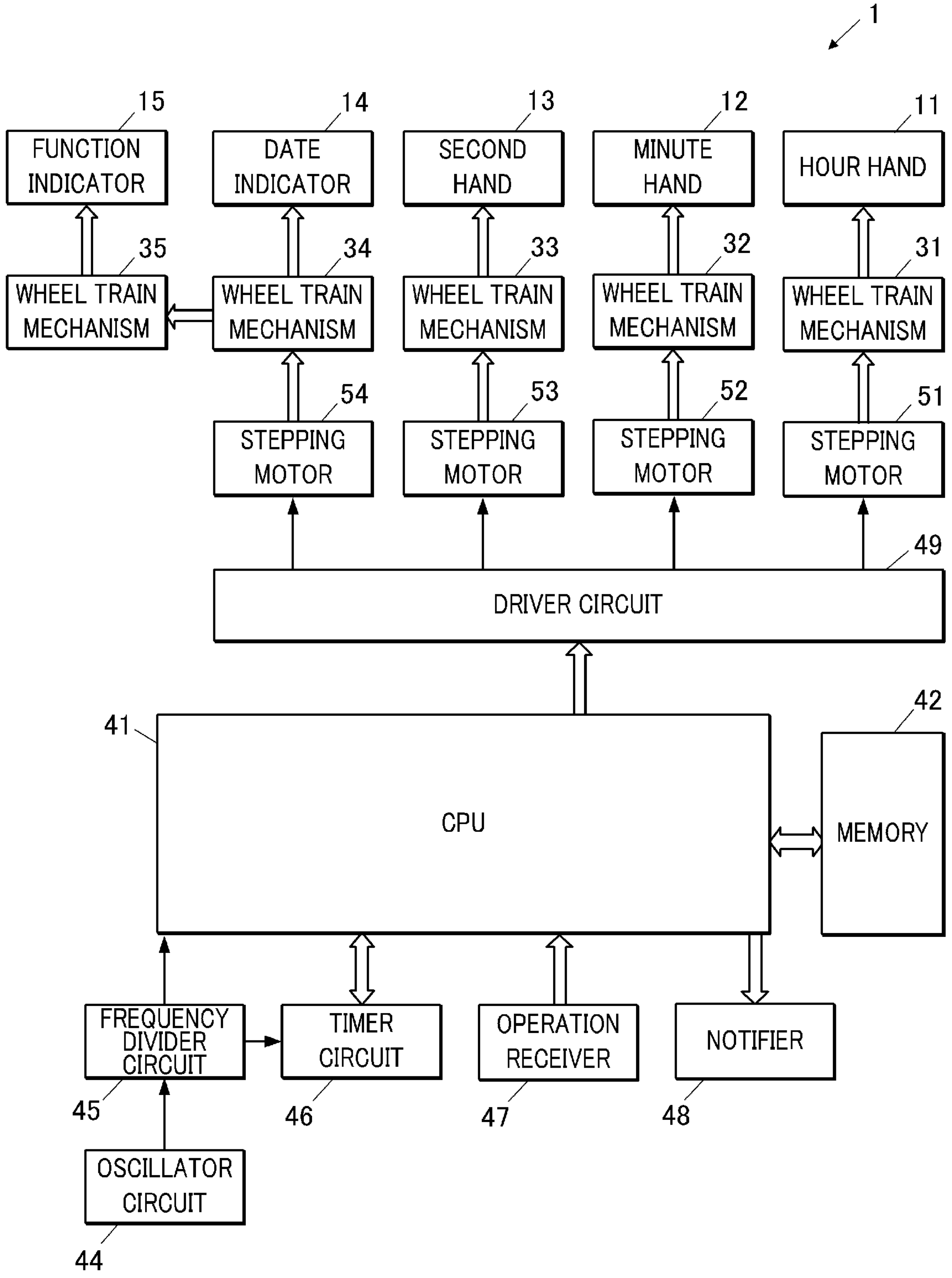
FIG. 2 is a block diagram showing functional components of the analog electronic timepiece.

FIG. 2 is a block diagram showing functional components of the analog electronic timepiece 1.

The analog electronic timepiece 1 (electronic timepiece) includes: the hour hand 11; a stepping motor 51 that causes the hour hand 11 to rotate via a wheel train mechanism 31; the minute hand 12; a stepping motor 52 that causes the minute hand 12 to rotate via a wheel train mechanism 32; the second hand 13; a stepping motor 53 that causes the second hand 13 to rotate via a wheel train mechanism 33; the date indicator 14; the function indicator 15; a stepping motor 54 that causes the date indicator 14 and function indicator 15 to rotate in combination with each other via wheel train mechanisms 34, 35; a central processing unit (CPU) 41 (at least one processor, a controller); a memory 42; an oscillator circuit 44; a frequency divider circuit 45; a timer circuit 46; an operation receiver 47; a notifier 48; and a driver circuit 49.

The CPU 41 performs various arithmetic processes and centrally controls overall operations of the analog electronic timepiece 1. The CPU 41 outputs control signals to the driver circuit 49 at appropriate timings to rotate the hour hand 11, minute hand 12, second hand 13, date indicator 14, and function indicator 15 (all or part of the indicators are hereinafter called as indicators 11 to 15, for example).

The memory 42 provides the CPU 41 with a work memory space and stores various programs that are performed by the CPU 41, initial setting data to be used in these programs, and temporary data. These programs and initial setting data are read, executed, and used by the CPU 41 when needed or when the analog electronic timepiece 1 is turned on. The memory 42 includes a Random Access Memory (RAM) and a nonvolatile memory, for example. The RAM stores temporary data on which read-write operations are performed at high speed according to the processing of the CPU 41. The nonvolatile memory stores the programs and initial setting data. The memory 42 may include a masked read only memory (ROM) that stores part of the programs and initial setting data that is not subject to updates and that relates to basic operations.

The oscillator circuit 44 generates frequency signals and outputs them to the frequency divider circuit 45. The frequency divider circuit 45 divides the frequency signals input by the oscillator circuit 44, generates signals having a frequency that is set according to control signals of the CPU 41, and outputs the generated signals to the CPU 41. The frequency divider circuit 45 also generates predetermined frequency signals (e.g., one-second signals) and outputs them to the timer circuit 46. The timer circuit 46 is a counter that counts the input frequency signals to calculate date and time. The timer circuit 46 may be a memory, such as a DRAM, that stores date and time calculated by the CPU 41 through software.

The operation receiver 47 receives operations input from outside, converts the operations into electric signals, and outputs the electric signals to the CPU 41 as input signals. The operation receiver 47 includes the pressing button switches B1, B2 and the crown C1. By performing input operations on the pressing button switches B1, B2 and the crown C1, the user can correct the current time and cause the analog electric timepiece 1 to indicate local times of various areas in the world and to perform operations relating to various functions including the alarming function, stopwatch function, and timer function. Functions are switched by turning the crown C1, for example. When the crown C1 is pulled out, the analog electric timepiece 1 goes into a function switching mode. When the crown C1 is pushed back, the analog electric timepiece 1 determines the selected function.

The notifier 48 performs a notification operation(s). Examples of the notification operation include generating buzzers, generating vibrations, and lighting (turning on and off) a lamp. The notifier 48 has one or more structures corresponding to these operations. To generate buzzers, the notifier 48 uses a diaphragm and a piezoelectric element(s) both ends of which are provided with electrodes, for example. To generate vibrations, a rotary motor with a weight(s) is used, for example. To light the lamp, a light emitting diode (LED) is used, for example.

The stepping motors 51 to 54 are driven such that their rotors rotate with respect to the stators according to voltage waveforms of drive pulses input by the driver circuit 49. With the rotation of the rotors, the driven stepping motors 51 to 54 operate the wheel train mechanisms 31 to 35 each of which is a train of wheels, thereby causing the indicators 11 to 15 to rotate in a regular rotation direction (clockwise direction) or in a counter rotation direction (counterclockwise direction) by their respective predetermined angles. The wheels of the train mechanisms 34, 35 are branched and arranged such that the gear ratio of the first wheel that rotates with the rotation of the rotor of the stepping motor 54 and the wheel that rotates by the same angle as the date indicator 14 is different from the gear ratio of the first wheel and the wheel that rotates by the same angle as the function indicator 15. The stepping motor 54 operates the wheel train mechanisms 34, 35 simultaneously and causes the date indicator 14 and the function indicator 15 to rotate in combination with each other by different angles. More specifically, the function indicator 15 rotates when the date indicator 14 rotates, and the date indicator 14 rotates when the function indicator 15 rotates. The stepping motors 51 to 54 can be driven in the regular rotation direction at the maximum speed of 64 pulses per second (pps) by drive pulses and in the counter rotation direction at the maximum speed of 32 pps by drive pulses. The analog electric timepiece 1 normally drives the stepping motors 51 to 54 at the highest speed in both the regular and counter rotation directions in performing the fast movement.

The driver circuit 49 outputs drive pulses to the stepping motors 51 to 54 at their respective set pulse widths in accordance with control signals output by the CPU 41 for operating the indicators 11 to 15. The driver circuit 49 is configured not to output drive pulses to multiple stepping motors simultaneously. When instructions to move multiple indicators are input simultaneously, the driver circuit 49 outputs drive pulses to the stepping motors in turn in accordance with a predetermined priority order of the indicators to be moved.

The wheel train mechanisms 31 to 35 of the analog electronic timepiece 1 in this embodiment are structured, per one drive of the stepping motors 51 to 54, such that: the hour hand 11 and minute hand 12 rotate by one degree; the second hand 13 and function indicator 15 rotate by six degrees; and the date indicator 14 rotates by 1/62 degree (360/(31×720) degree). That is, the date indicator 14 requires 720 steps to rotate to indicate the icon of the next day, and in combination with the date indicator 14, the function indicator 15 makes 12 revolutions in the small window 9 (makes one revolution or more at twice or more than twice the speed of the date indicator 14). In the normal time indication mode, the date indicator 14 rotates by 720 steps in the fast movement to change the exposed icons by one day at the timing when the date changes, namely at every two timings when the hour hand 11 indicates 12 o'clock. The rotation by 720 steps in the fast movement at 64 pps takes 11.25 seconds. In changing dates from February 28 to March 1, the date indicator 14 needs to rotate for four dates and therefore requires 45.0 seconds to change indicated dates.

Next, how to control operations of the function indicator 15 is described.

Figure 3A:
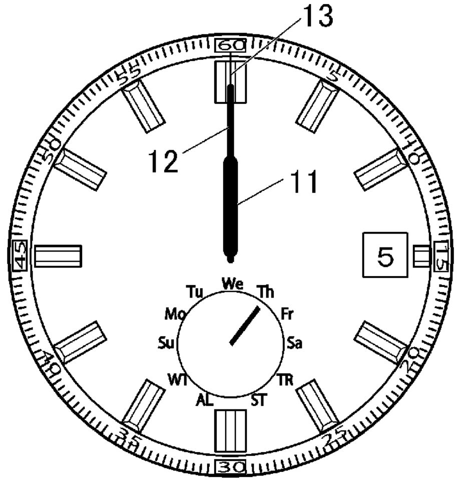
FIG. 3A is a figure to explain how indicators are shown and operated.
Figure 3B:
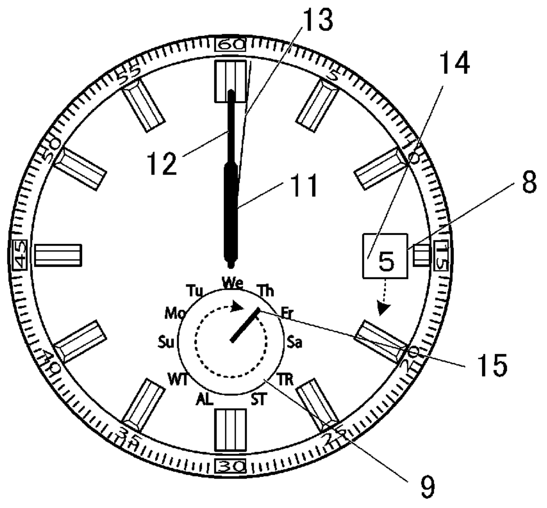
FIG. 3B is a figure to explain how indicators are shown and operated.
Figure 3C:
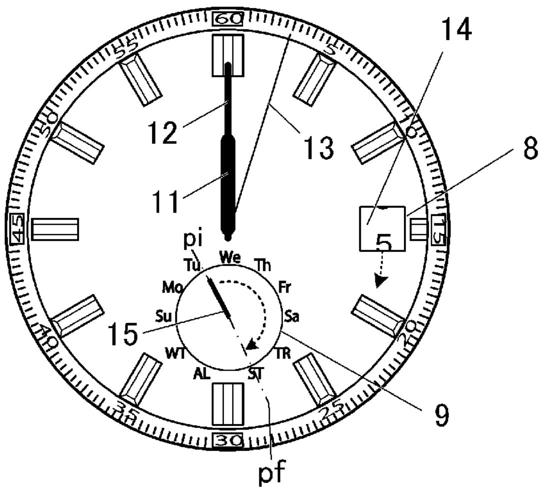
FIG. 3C is a figure to explain how indicators are shown and operated.

FIGS. 3A to 3C are figures to explain how the indicators 11 to 15 are shown and operated.

The function indicator 15 is normally controlled to move between indication positions within the 360-degree rotation range. As described above, the date indicator 14 rotates by one twelfth of the degrees between adjacent date icons while the function indicator 15 makes one revolution. The date icon in FIG. 3B is only slightly shifted (by less than one degree) in the opening 8 as compared with FIG. 3A. Such a position shift hardly has impact on the indication with the date indicator 14. However, the amount of position shifts increases cumulatively when the indicators 14, 15 are caused to keep rotating in one direction. To avoid this, the function indicator 15 may be limited to rotate within the range of ±180 degrees from the position of the date icon.

The function indicator 15 can indicate the icons showing days of the week and the icons showing function modes, as described above. The function indicator 15 is controlled to indicate the icons for days of the week in the normal time indication mode and to indicate the icons showing the function mode in any of the function modes.

In changing the indicated date by rotating the date indicator 14, the function indicator 15 normally keeps rotating to make 12 revolutions in the fast movement (plus or minus the amount of change of the days of the week in normal time indication mode) and does not continuously indicate a specific icon while rotating. On the other hand, when the analog electronic timepiece 1 receives an input operation to change the function mode or an input operation to request indication of the day of the week during the fast movement in which the date indicator 14 is rotating, the analog electronic timepiece 1 interrupts (temporarily stops) the fast movement and causes the function indicator 15 to temporarily indicate the position that corresponds to the received input operation.

In FIG. 3C, when the function indicator 15 is at the position pi in the fast movement, an indication request (request to indicate a set position) is made in accordance with an input operation. The analog electronic timepiece 1 causes the date indicator 14 and the function indicator 15 to temporarily stop rotating (i.e. causes the stepping motor 54 to temporarily stop operating) when the function indicator 15 first arrives at the position pf, the position of the target icon to be indicated. The function indicator 15 thus temporarily indicates the target icon. The function indicator 15 keeps stopping during a set temporary stop time. After the temporary stop time, the function indicator 15 and the date indicator 14 resume rotating in the fast movement (i.e., the stepping motor 54 resumes operating). The temporary stop time is, for example, 1 to 5 seconds or so in which the user can properly recognize the indication. The function indicator 15 may pass through the set position multiple times while the date indicator 14 is rotating, depending on the timing when the function indicator 15 is requested to indicate the set position. Herein, the function indicator 15 temporarily stops only when the function indicator 15 first arrives at the set position. When the analog electronic timepiece 1 receives the above input operations multiple times during the fast movement, the function indicator 15 stops at the indication positions corresponding to the respective input operations. During the temporary stop time, the date indicator 14 stops at a position between two date icons. In FIG. 3C, the date indicator 14 stops in a state where the date icon "5", which indicates the date 5, is slightly off the opening 8. The user can recognize that the date indicator 14 is in the process of changing dates from 5 to 6.

Figure 4:
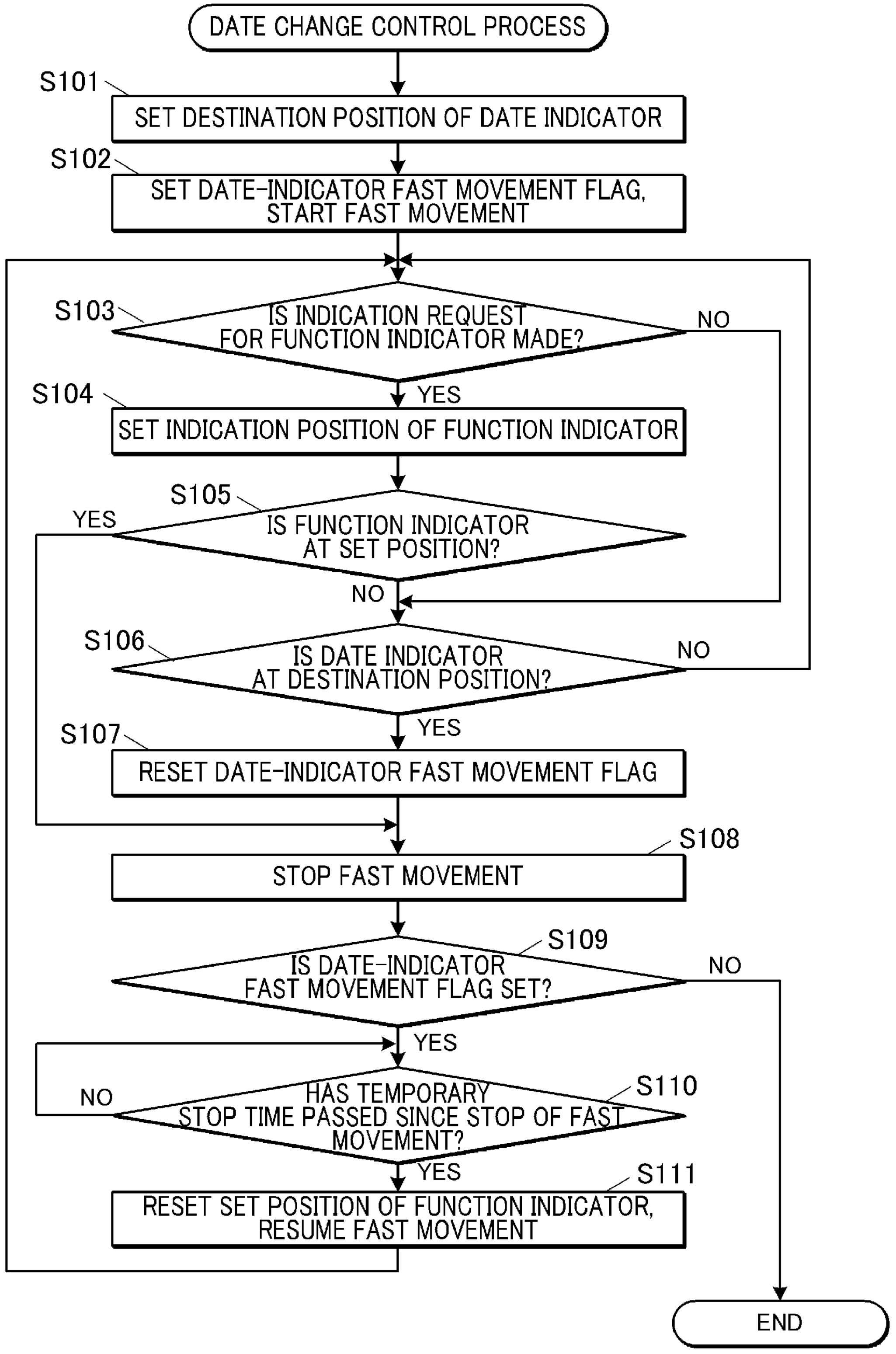
FIG. 4 is a flowchart showing control procedure of a date change control process.

FIG. 4 is a flowchart of a date change control process that is controlled by the CPU 41 of the analog electronic timepiece 1. The date change control process starts when the time calculated by the timer circuit 46 becomes 0:00, namely when the date changes.

When the date change control process starts, the CPU 41 sets the destination position of the date indicator 14 (Step S101). The destination position is set to the position of the next day icon when the date to be indicated is positioned within ±180 degrees from the position/day of the week that is currently indicated by the function indicator 15. The CPU 41 sets a date-indicator fast movement flag and outputs control signals to the driver circuit 49 to start the fast movement of the date indicator 14 and the function indicator 15. More specifically, the CPU 41 causes the driver circuit 49 to start continuously outputting driving signals to the stepping motor 54 at, for example, 64 pps as described above (Step S102).

The CPU 41 determines whether or not a request to cause the function indicator 15 to indicate a specific position has been made (Step S103). More specifically, the CPU 41 determines whether or not the function indicator 15 needs to perform indication in response to an input operation on the pressing button switches B1, B2 or the crown C1. When determining that the request has not been made (Step S103: NO), the CPU 41 proceeds to Step S106.

When determining that the request has been made (Step S103: YES), the CPU 41 sets the indication position to be indicated by the function indicator 15 (Step S104). When the indication position has already been set, the CPU 41 does not need to repeat the process of Step S104. When the set indication position of the function indicator 15 is different from the position of the function indicator 15 at the time the date indicator 14 starts rotating, the CPU 41 also changes the destination position of the date indicator 14. The CPU 41 determines whether or not the function indicator 15 is at the set indication position (Step S105). When determining that the function indicator 15 is at the set indication position (Step S105: YES), the CPU 41 proceeds to Step S108. When determining that the function indicator 15 is not at the set indication position (set position) (Step S105: NO), the CPU 41 proceeds to Step S106.

After proceeding to Step S106 from Step S103 or S105, the CPU 41 determines whether or not the date indicator 14 has arrived at the destination position (Step S106). When determining that the date indicator 14 has not arrived at the destination position yet (Step S106: NO), the CPU 41 returns to Step S103. When determining that the date indicator 14 has arrived at the destination position (Step S106: YES), the CPU 41 clears the fast movement flag (Step S107) and proceeds to Step S108.

After proceeding to Step S108 from Step S105 or Step S107, the CPU 41 outputs control signals to the driver circuit 49 to stop the fast movement of the date indicator 14 and the function indicator 15 (step S108). More specifically, the CPU 41 stops the driver circuit 49 from outputting driving signals to the stepping motor 54. The CPU 41 determines whether or not the fast movement flag is set (Step S109). When determining that the fast movement flag is not set (Step S109: NO), the CPU 41 ends the date change control process.

When determining that the fast movement flag is set (Step S109: YES), the CPU 41 determines whether or not the temporary stop time has passed since the stop of the fast movement (Step S110). When determining that the temporary stop time has not passed yet (Step S110: NO), the CPU 41 repeats the process of Step S110. When determining that the temporary stop time has passed (Step S110: YES), the CPU 41 resets the set position (clears the setting) that is currently indicated by the function indicator 15 and outputs control signals to the driver circuit 49 to resume the fast movement of the date indicator 14 and the function indicator 15 (Step S111). More specifically, the CPU 41 causes the driver circuit 49 to resume outputting driving signals to the stepping motor 54. The CPU 41 then returns to Step S103.

Steps S103 and S104 constitute the indication setting (indication setting step), and Steps S105 and S108 constitute the temporary indicating (temporary indicating step) in the indication control method of this embodiment. The temporary indicating may further include Steps S109 to S111.

Next, a modification of the date change operation is described.

Figure 5A:
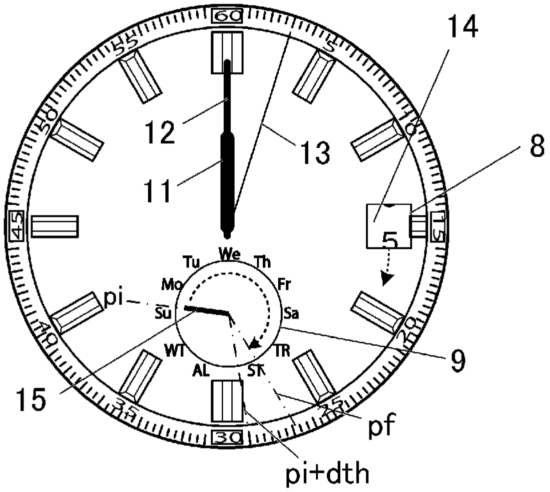
FIG. 5A is a figure to explain a modification of a date change operation.
Figure 5B:
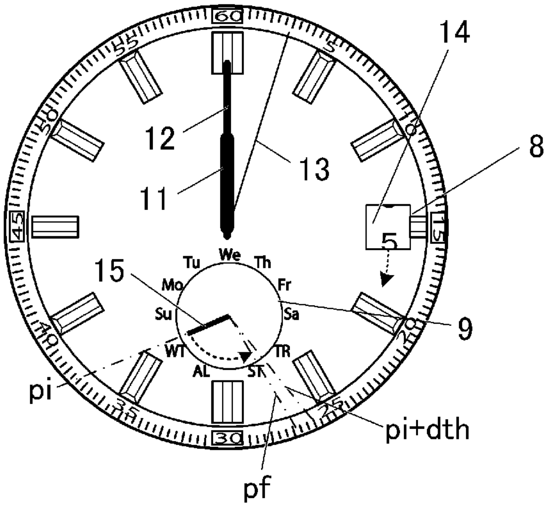
FIG. 5B is a figure to explain the modification of the date change operation.

FIGS. 5A and 5B are figures to explain the modification of the date change operation.

In the modified date change operation, the CPU 41 determines in which rotation direction the function indicator 15 arrives at the set indication position earlier (with shorter time) from the current indication position (current position) in the fast movement, in the regular rotation direction or the counter rotation direction. The CPU 41 then temporarily moves the function indicator 15 to the set indication position in the fast movement in the determined rotation direction, in which the function indicator 15 arrives at the set indication position earlier. In the fast movement, the indicators rotate in the regular rotation direction at twice the speed of the counter rotation direction. Further, due to the backlash (play in the wheel train mechanisms), changing the regular rotation direction to the counter rotation direction requires some steps (e.g., steps corresponding to a few driving signals) with which the indicators do not move. For example, when the angle between the current indication position of the function indicator 15 and the set position in the regular direction is equal to or smaller than 252°, the CPU 41 determines that the function indicator 15 arrives at the set position earlier in the regular rotation direction in the fast movement, as shown in FIG. 5A. When the angle is equal to or greater than 258° (greater than 252°), the CPU 41 determines that the function indicator 15 arrives at the set position earlier in the counter rotation direction in the fast movement, as shown in FIG. 5B. After arriving and temporarily stopping at the set position, the function indicator 15 resumes the fast movement in the regular rotation direction, as in the normal operation.

Figure 6:
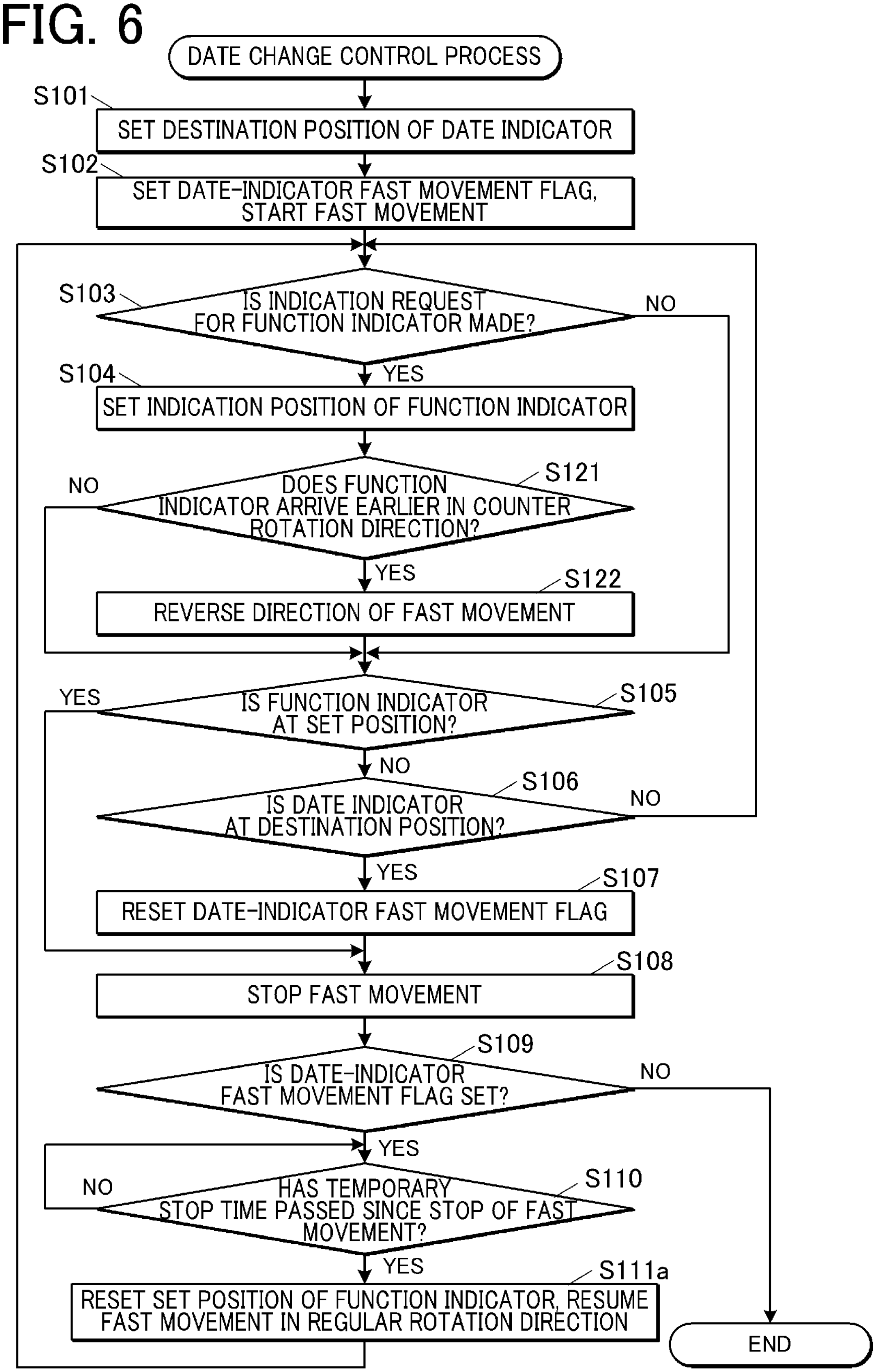
FIG. 6 is a flowchart showing a modification of the date change control process.

FIG. 6 is a flowchart of a modification of the above-described date change control process.

The modification of the date change control process additionally includes Steps S121, S122, and includes Step S111*a* instead of Step S111. The other steps are the same as the above-described date change control process. The like processing contents have the like reference numerals, and the description thereof is omitted.

In the modification of the date change control process, the CPU 41 sets the indication position of the function indicator 15 in the process of Step S104. The CPU then determines whether the function indicator 15 arrives at the set position from the current indication position earlier in the counter rotation direction than in the regular rotation direction in the fast movement (Step S121). When determining that the function indicator 15 arrives at the set position earlier in the counter rotation direction (Step S121: YES), the CPU 41 outputs control signals to the driver circuit 49 to drive the stepping motor 54 in the counter rotation direction, thereby reversing the rotation direction of the date indicator 14 and the function indicator 15 in the fast movement (Step S122). The CPU 41 then proceeds to Step S105. When determining that the function indicator 15 does not arrive at the set position earlier in the counter rotation direction (i.e., arrives earlier in the regular rotation direction) (Step S121: NO), the CPU 41 proceeds to Step S105.

When determining that the temporary stop time has passed since the stop of the fast movement (Step S110: YES), the CPU 41 clears the setting of the indication position of the function indicator 15 and resumes rotating the function indicator 15 in the regular rotation direction in the fast movement (Step S111*a*). The CPU 41 then returns to Step S103.

As described above, the analog electronic timepiece 1 in this embodiment includes: the date indicator 14 and the function indicator 15 that are configured to rotate in combination with each other; the operation receiver 47; and the CPU 41. The CPU 41 sets a set position that is to be indicated by the function indicator 15 according to an input operation received by the operation receiver 47. The CPU 41 further causes the date indicator 14 and the function indicator 15 to temporarily stop rotating when the function indicator 15 indicates the set position while the date indicator 14 is rotating.

In a known art, the function indicator 15 is unable to indicate a specific icon in response to an input operation received by the operation receiver 47 while the date indicator 14 is rotating. The analog electronic timepiece 1 can cause the function indicator 15 to temporarily stop at the set position while the date indicator 14 is rotating, thereby showing appropriate indication contents to the user who performed the input operation. The analog electronic timepiece 1 can quickly perform indication in response to an operation received while the date indicator 14 is rotating, and thereby can avoid forcing the user to wait long for the indication. Multiple indicators that rotate in combination with each other may require a long time to arrive at their desired positions.

A known art cannot shorten the time required for changing one indication and cannot show the other indication until one indication is changed, thereby being unable to quickly perform appropriate indications for the user. The analog electronic timepiece 1 according to the present disclosure, on the other hand, can more quickly perform appropriate indications for the user.

Further, while the date indicator 14 is rotating, the function indicator 15 may pass through the set position multiple times after the set position is set until the date indicator 14 arrives at a target indication position. In such a case, the CPU 41 causes the date indicator 14 and the function indicator 15 to temporarily stop rotating only at a timing when the function indicator 15 first indicates the set position. The analog electronic timepiece 1 thus sufficiently shows indications once for the user. After the first temporary stop, the CPU 41 can quickly move the date indicator 14 to the destination position as in the normal state and return to the normal mode.

Further, the set position may be set while the date indicator 14 is rotating. In such a case, the CPU 41 determines a rotation direction in which the function indicator 15 arrives at the set position in a short time from the current position. The CPU 41 then causes the date indicator 14 and the function indicator 15 to rotate in the determined rotation direction until the function indicator 15 first indicates the set position. More specifically, when the function indicator 15 can indicate the set position earlier in the counter rotation direction, the CPU 41 may temporarily prioritize quickly indicating the set position with the function indicator 15. In such a case, the date indicator 14 requires a little longer time to finish rotating.

Further, the rotation angle of the function indicator 15, which rotates in combination with the date indicator 14, is twice or more than twice the rotation angle of the date indicator 14. The date indicator 14 requires a longer time in rotation than the function indicator 15, which moves in a shorter time. The CPU 41 causes the function indicator 15 to temporarily indicate the set position while the date indicator 14 is rotating, thereby quickly performing indication with the function indicator 15. This can efficiently reduce waiting time of the user.

Further, the date indicator 14 is a rotatable plate provided with date icons at intervals of a specific angle (360/31 degree), and the function indicator 15 makes one revolution or more while the date indicator 14 rotates by the specific angle. The rotatable disc tends to require more rotating steps with respect to the torque ratio than indicating hands. When the date indicator 14 is in the process of rotating, the user can recognize to what date the date is being changed by recognizing either the coming date number or the passing date number of the date indicator 14. Therefore, causing the function indicator 15 to temporarily indicate the set position while the date indicator 14 is rotating is more effective.

Further, the indication control method for the analog electronic timepiece 1 in this embodiment includes indication setting and temporary indicating. The indication setting is setting the set position that is to be indicated by the function indicator 15 according to an input operation received by the operation receiver 47. The temporary indicating is causing the function indicator 15, which rotates in combination with the date indicator 14, to temporarily stop rotating at a timing when the function indicator 15 indicates the set position while the date indicator 14 is rotating.

By changing indications with the indication control method, the user does not have to wait throughout the rotation of the date indicator 14 when the user desires to check the indication of the function indicator 15 while the date indicator 14 is rotating. Unnecessary waiting time can be reduced, and desired information can be quickly shown to the user.

The above embodiment does not limit the present invention and can be variously modified. For example, the above embodiment uses the date indicator 14 and the function indicator 15 that rotate in combination with each other and causes the function indicator 15 to temporarily perform an indication while the date indicator 14 is rotating. However, the above combination of indicators does not limit the present invention. For example, the rotatable disc may have icons showing local time setting instead of date icons and may be combined with another indicator. Further, the function indicator 15 may be an indicator that is capable of indicating only the days of the week or only the function modes. Further, in addition to or instead of indicating the function modes, the function indicator 15 may be capable of indicating various statuses, such as reception conditions of radio waves in changing dates or the status of airplane mode in which transmission and reception of radio waves are prohibited. Further, the combination of indicators is not limited to the combination of a rotatable disc and an indicating hand, but may be a combination of two indicating hands.

Further, in the above embodiment, the function indicator 15 temporarily stops only when the function indicator first arrives at the set position while the date indicator 14 is rotating. Alternatively, the function indicator 15 may temporarily stop every time the function indicator 15 arrives at the set position. In such a case, the temporary stop time for the second and thereafter timings may be shorter than the temporary stop time for the first timing. When, for example, the date indicator 14 rotates for a long time, the function indicator 15 may temporarily stop every time the function indicator 15 arrives at the set position after a predetermined time has passed. That is, the function indicator 15 may temporarily stop intermittently.

Further, in a case where the set position of the function indicator 15 is set when the date indicator is not rotating, the function indicator 15 may temporarily stop at the set position multiple times according to the movement of the date indicator 14. More specifically, when the date indicator 14 does not need to rotate, the function indicator 15 ends rotating when first arriving at the set position. When thereafter the date indicator 14 changes its indication position, the function indicator 15 may temporarily stop at the set position that has been already set and indicated (the state corresponds to Step S104: the indication position has already been set) while the date indicator 14 is rotating.

Further, in the above embodiment, the date indicator 14 performs the fast movement only in the regular rotation direction. However, the date indicator 14 (first indicator) may perform the fast movement in the counter rotation direction. In such a case, in the modification of the date change control process, the date indicator 14 (first indicator) and the function indicator 15 (second indicator) may be controlled to perform the fast movement in the direction in which the function indicator 15 arrives at the set position earlier until the function indicator 15 first indicates the set position. The rotation direction may then be fixed to the normal rotation direction, in which the date indicator 14 normally performs the fast movement.

Further, the operation receiver 47 may not be the combination of the pressing button switches B1, B2 and the crown C1. The operation receiver 47 may be only either a pressing button switch(es) or a crown, or may be any other structure that can receive operations. As the other structure, a touchscreen may be used, for example. Further, tilting the analog electronic timepiece 1 in a specific direction may be detected as a target operation.

Further, in the above embodiment, the CPU 41 sets the fast movement flag to determine whether or not the date indicator 14 is rotating in the fast movement. Alternatively, the CPU 41 may directly compare the current positon and the destination position of the date indicator 14 to determine whether or not the date indicator 14 is rotating in the fast movement.

The detailed structures, processes, and processing procedure may be appropriately modified without departing from the scope of the present invention.

Although some embodiments of the present invention have been described and illustrated in detail, the disclosed embodiments are made for purposes of illustration and example only and not limitation. The scope of the present invention includes the scope of the present invention described in the scope of claims and the scope of their equivalents.

What is claimed is:

1. An electronic timepiece comprising:
a first indicator and a second indicator that are configured to rotate in combination with each other;
an operation receiver; and
at least one processor configured to:
set a set position that is to be indicated by the second indicator in response to an input operation received by the operation receiver;
in a situation where the second indicator would pass through the set position multiple times after the set position is set while the first indicator is rotating to a target indication position, cause the first indicator and the second indicator to temporarily stop rotating in combination with each other only at a timing when the second indicator initially indicates the set position; and
cause the first indicator and the second indicator to resume rotating in combination with each other after a set time passes.

2. The electronic timepiece according to claim 1,
wherein the set position is set while the first indicator is rotating, and
wherein the at least one processor is configured to:
determine a rotation direction, between two rotation directions, in which the second indicator arrives at the set position in a shorter time from a current position; and
cause the first indicator and the second indicator to rotate in the rotation direction determined until the second indicator first indicates the set position.

3. The electronic timepiece according to claim 1,
wherein a rotation angle of the second indicator that rotates in combination with the first indicator is twice or more than twice a rotation angle of the first indicator.

4. The electronic timepiece according to claim 3,
wherein the first indicator comprises a rotatable plate provided with icons at an interval of a specific angle, and
wherein the second indicator is configured to make one revolution or more while the first indicator rotates by the specific angle.

5. The electronic timepiece according to claim 1,
wherein the set time is between 1 and 5 seconds.

6. The electronic timepiece according to claim 1,
wherein the at least one processor is configured to cause the first indicator and the second indicator to temporarily stop rotating in combination with each other and resume rotating in combination with each other multiple times based on the input operation received by the operation receiver.

7. The electronic timepiece according to claim 1,
wherein the first indicator is a date indicator, and
wherein the second indicator is a function indicator that indicates one of a day of the week and a function mode.

8. An indication control method for an electronic timepiece that includes a first indicator and a second indicator configured to rotate in combination with each other, and an operation receiver, the indication control method comprising:
setting a set position that is to be indicated by the second indicator in response to an input operation received by the operation receiver;
in a situation where the second indicator would pass through the set position multiple times after the set position is set while the first indicator is rotating to a target indication position, causing the first indicator and the second indicator to temporarily stop rotating in combination with each other only at a timing when the second indicator initially indicates the set position; and
causing the first indicator and the second indicator to resume rotating in combination with each other after a set time passes.

9. The indication control method according to claim 8,
wherein the set position is set while the first indicator is rotating,
wherein a rotation direction, between two rotation directions, is determined in which the second indicator arrives at the set position in a shorter time from a current position, and
wherein the first indicator and the second indicator are caused to rotate in the rotation direction determined until the second indicator first indicates the set position.

10. The indication control method according to claim 8,
wherein a rotation angle of the second indicator that rotates in combination with the first indicator is twice or more than twice a rotation angle of the first indicator.

11. The indication control method according to claim 10,
wherein the first indicator comprises a rotatable plate provided with icons at an interval of a specific angle, and
wherein the second indicator makes one revolution or more while the first indicator rotates by the specific angle.

12. The indication control method according to claim 8,
wherein the set time is between 1 and 5 seconds.

13. The indication control method according to claim 8,
wherein the first indicator and the second indicator are caused to temporarily stop rotating in combination with each other and resume rotating in combination with each other multiple times based on the input operation received by the operation receiver.

14. The indication control method according to claim 8,
wherein the first indicator is a date indicator, and
wherein the second indicator is a function indicator that indicates one of a day of the week and a function mode.

* * * * *